(12) United States Patent
Stempel et al.

(10) Patent No.: US 7,650,466 B2
(45) Date of Patent: Jan. 19, 2010

(54) METHOD AND APPARATUS FOR MANAGING CACHE PARTITIONING USING A DYNAMIC BOUNDARY

(75) Inventors: Brian Michael Stempel, Raleigh, NC (US); James Norris Dieffenderfer, Apex, NC (US); Jeffrey Todd Bridges, Raleigh, NC (US); Thomas Andrew Sartorius, Raleigh, NC (US); Rodney Wayne Smith, Raleigh, NC (US); Robert Douglas Clancy, Raleigh, NC (US); Victor Roberts Augsburg, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 11/233,575

(22) Filed: Sep. 21, 2005

(65) Prior Publication Data
US 2007/0067574 A1  Mar. 22, 2007

(51) Int. Cl.
*G06F 12/00* (2006.01)
(52) U.S. Cl. .................. 711/129; 711/133; 711/134; 711/153; 711/170; 711/173
(58) Field of Classification Search .................. None
See application file for complete search history.

(56) References Cited

U.S. PATENT DOCUMENTS 5,982,397 A * 11/1999 Walsh ..................... 345/558
6,094,695 A * 7/2000 Kornher ..................... 710/56
6,192,450 B1 * 2/2001 Bauman et al. ............. 711/135
2005/0021911 A1  1/2005 Moyer et al.

FOREIGN PATENT DOCUMENTS

JP       06124237    5/1994
WO       0150269     7/2001

* cited by examiner

*Primary Examiner*—Reginald G Bragdon
*Assistant Examiner*—Shawn X Gu
(74) *Attorney, Agent, or Firm*—Sam Talpalatsky; Nicholas J. Pauley; Peter M. Kamarchik

(57) ABSTRACT

A method of managing cache partitions provides a first pointer for higher priority writes and a second pointer for lower priority writes, and uses the first pointer to delimit the lower priority writes. For example, locked writes have greater priority than unlocked writes, and a first pointer may be used for locked writes, and a second pointer may be used for unlocked writes. The first pointer is advanced responsive to making locked writes, and its advancement thus defines a locked region and an unlocked region. The second pointer is advanced responsive to making unlocked writes. The second pointer also is advanced (or retreated) as needed to prevent it from pointing to locations already traversed by the first pointer. Thus, the pointer delimits the unlocked region and allows the locked region to grow at the expense of the unlocked region.

24 Claims, 2 Drawing Sheets

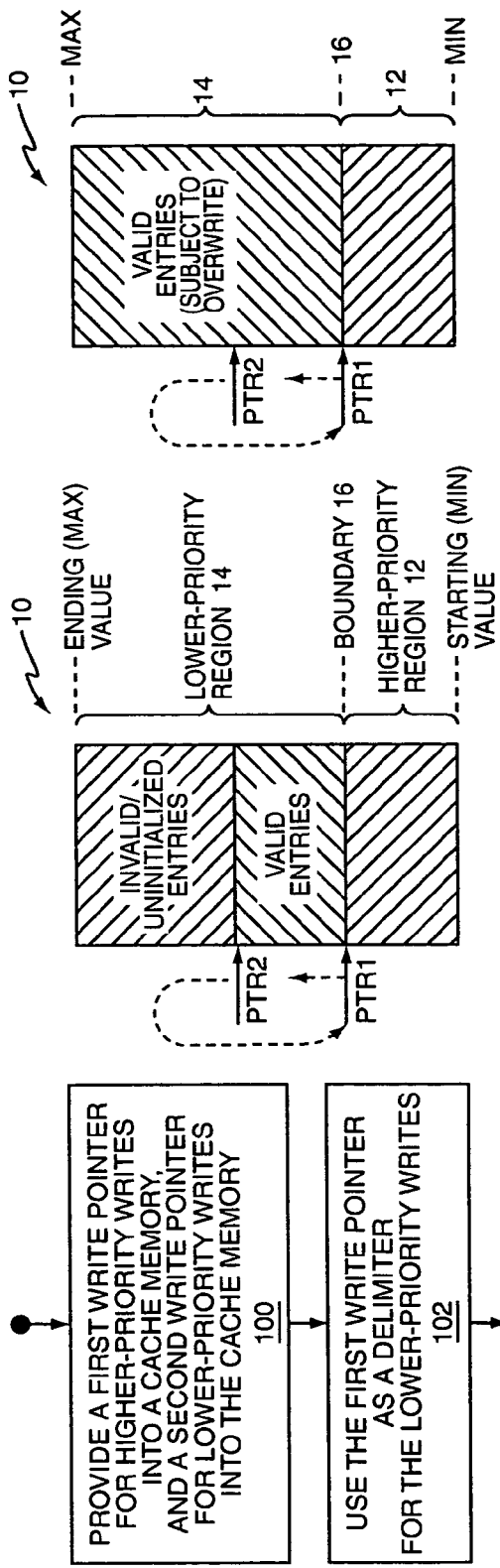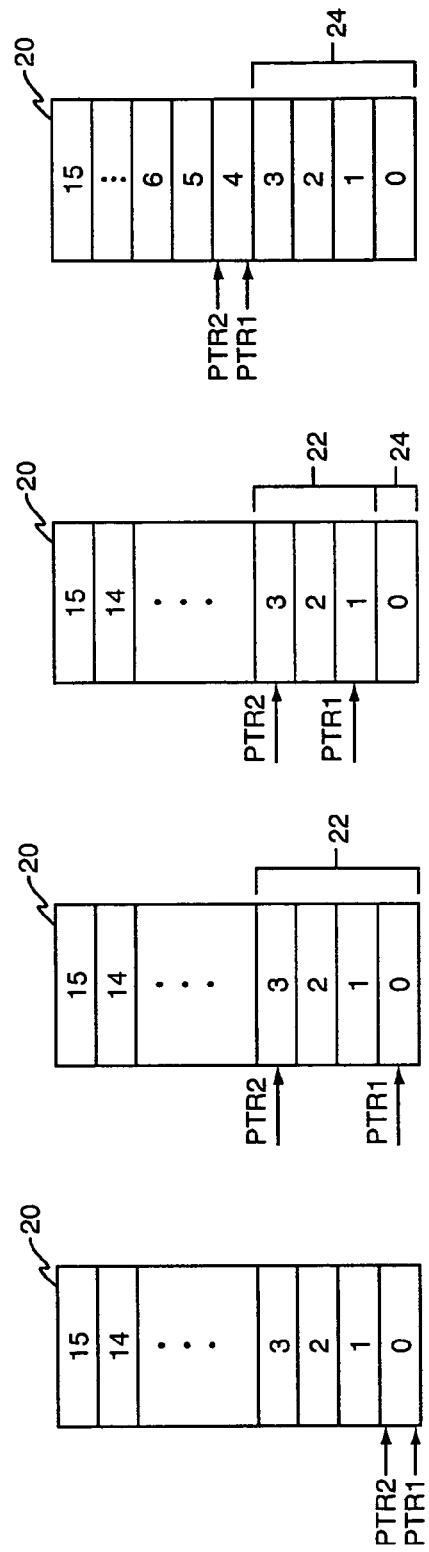

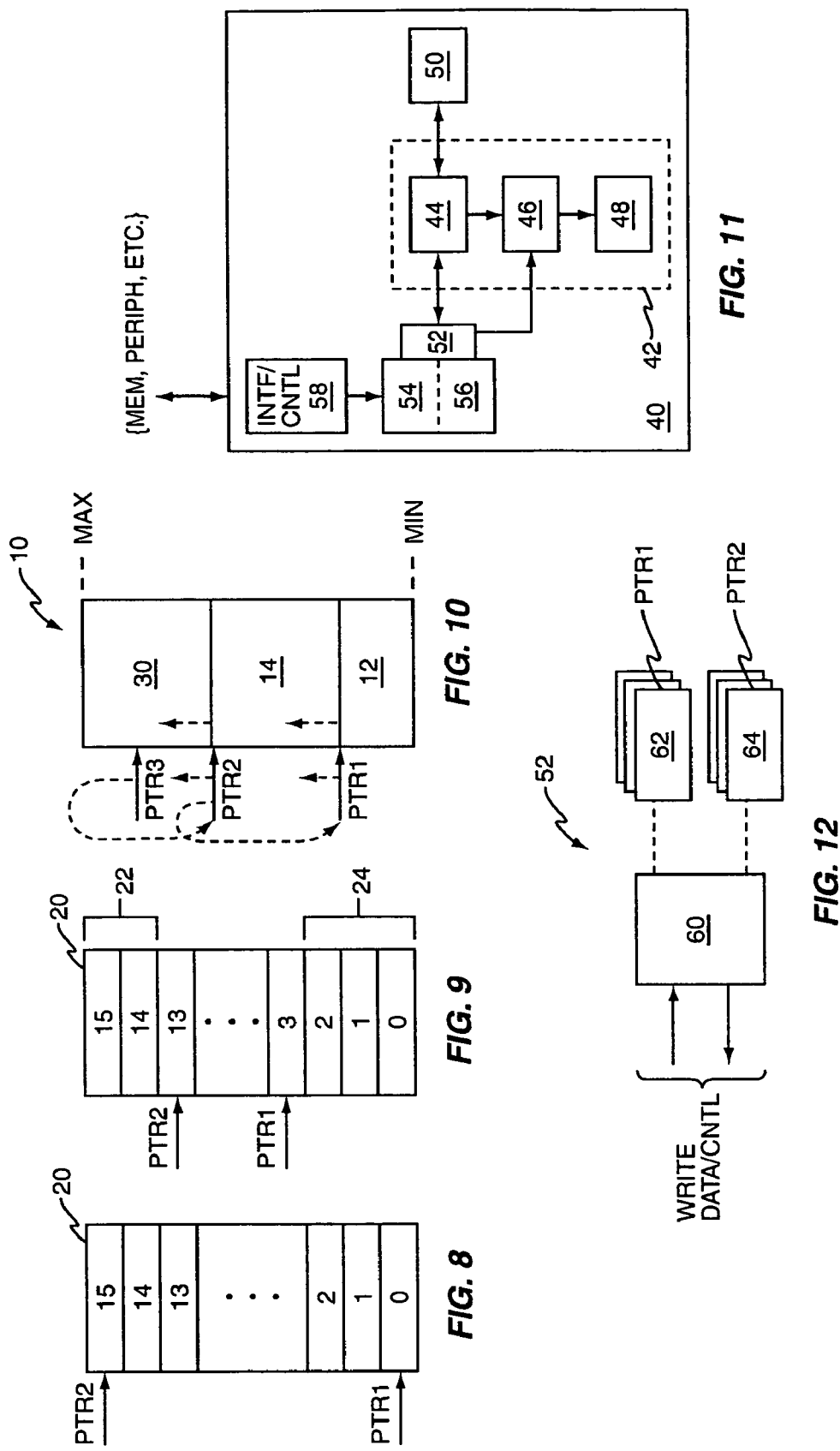

METHOD AND APPARATUS FOR MANAGING CACHE PARTITIONING USING A DYNAMIC BOUNDARY

BACKGROUND

1. Field of the Invention

The present invention generally relates to cache memories, and particularly relates to managing partitioning of such memories, such as between higher and lower priority entries.

2. Relevant Background

Partitioning cache memories into locked and unlocked regions represents a common practice. More particularly, it is known to apportion the ways of a cache set between locked and unlocked entries, but conventional approaches to locked/unlocked partition management have certain drawbacks.

For example, one method of dividing cache ways into locked and unlocked portions uses a total of three pointers per cache set. The three pointers include a locked pointer to indicate the next locked entry in the cache set, and an unlocked pointer used to indicate the next unlocked entry in the cache set. The third pointer defines an upper limit or ceiling for the locked entry partition, and thus establishes a fixed floor for the unlocked partition. That is, with the three-pointer approach, two pointers are used to manage successive writes for the locked and unlocked portions of the cache set, and a third pointer is used to indicate the fixed boundary between the locked and unlocked portions of the cache set.

Another approach to managing locked and unlocked portions of a given cache set relies on the use of locked/unlocked bits per cache line in each cache way of the set. With this approach, additional register bits mark individual cache lines as locked or unlocked.

While the above methods do permit at least limited management of locked and unlocked portions of cache sets, they do so at the expense of additional register usage, increased software overhead, and lowered cache usage efficiencies. These disadvantages become particularly problematic for large caches where significant register resources are given over to the management of cache memory partitions.

SUMMARY OF THE DISCLOSURE

One embodiment of a method of managing cache memory partitioning as taught herein comprises providing a first write pointer for higher priority writes into a cache memory and a second write pointer for lower priority writes into the cache memory, and using the first write pointer as a delimiter for the lower priority writes. Using the first write pointer as a delimiter for the lower priority writes comprises generally precluding the second write pointer from pointing to cache memory locations to which higher priority writes have been made.

Associating the first pointer with higher priority writes and constraining the position of the second pointer accordingly establishes a dynamic boundary between adjacent higher and lower priority regions of cache memory. In other words, ongoing lower priority writes may be conducted as needed, but cache memory locations consumed by those lower priority writes may be reclaimed for higher priority writes through manipulation of the first and second pointers. In this manner, the software executing on a microprocessor incorporating cache partitioning as taught herein need not explicitly set and manage partition boundaries.

For example, a microprocessor can be configured to provide two pointers per cache set, with the first one of these pointers denoted as a (higher priority) locked pointer and a second one of these pointers denoted as a (lower priority) unlocked pointer. A cache partition control circuit included in the microprocessor is configured to point the locked pointer to the first unlocked entry in the cache set, for example, such that all entries below the pointer are locked. Further, both the locked and unlocked pointers would point to the next victim in the cache set depending on whether the next cache write is a locked write or an unlocked write. With this configuration, the locked pointer serves as the floor of the unlocked region, and the unlocked pointer may be manipulated such that it moves to a maximum position in the cache set with successive unlocked writes and wraps back to the locked pointer.

BRIEF DESCRIPTION OF THE DRAWINGS

FIG. 1 is a logic flow diagram illustrating one embodiment of pointer management and resultant dynamic cache partitioning as taught herein.

FIGS. 2 and 3 are block diagrams of a cache memory, and illustrate the use of first and second pointers to create higher priority and lower priority regions of the cache memory with a dynamic boundary therebetween.

FIGS. 4-7 are block diagrams of a cache set and illustrate the use of a pair of pointers to manage dynamically partitioned ways in the cache set.

FIGS. 8 and 9 are block diagrams illustrating another embodiment of dynamically partitioning a cache set via the use of first and second pointers.

FIG. 10 is a block diagram illustrating the use of multiple pointers to create multiple dynamically bounded regions of differing priorities in a cache memory.

FIG. 11 is a block diagram of a microprocessor that incorporates a cache control circuit configured to carry out cache memory partitioning management through the use of pointer pairs, according to one or more of the methods taught herein.

FIG. 12 is a block diagram of a partition control circuit that may be included in, for example, the cache memory control circuit in the microprocessor of FIG. 11.

DESCRIPTION OF EMBODIMENTS OF THE INVENTION

FIG. 1 is a logic flow diagram broadly illustrating a method of managing cache memory partitioning as taught herein. The method is based on providing a first write pointer for higher priority writes into a cache memory, and a second write pointer for lower priority writes into the cache memory (Step 100).

With the pointer pair thus defined, the method uses the first write pointer as a delimiter for lower priority writes (Step 102). Effectively, the method creates higher and lower priority regions in a cache memory, wherein the higher priority pointer serves as a dynamic boundary between the two regions.

This arrangement is shown in FIG. 2 wherein a cache memory 10 (or at least a selected portion of a cache memory) includes a higher priority region 12 that is addressed by a first pointer (PTR1) and a lower priority region 14 that is addressed by a second pointer (PTR2). PTR1 defines a boundary 16 between regions 12 and 14. Using PTR1 to mark the boundary between the regions allows the higher priority region 12 to grow at the expense of the lower priority region 14. That is, for the illustrated memory layout, PTR1 can take on values from a given starting (minimum) value associated with a lower bound of the cache memory 10, up to an ending (maximum) value associated with an upper bound of the cache memory 10. In contrast, PTR2 can take on values ranging from the current value of PTR1 up to the upper bound of the cache memory 10. PTR2 thus is generally precluded from pointing to cache memory locations to which higher priority writes have been made.

With this arrangement, PTR1 may be configured to advance through the cache set up to the maximum pointer value, or up to a defined offset from the maximum pointer value. Moreover, PTR2 can be configured to advance through the cache memory up to the maximum pointer value and then wrap back to a current value of the first write pointer, or wrap back to a value corresponding to a defined offset from the current value of the first write pointer. FIG. 2 particularly illustrates that the lower priority region 14 may include valid and invalid (un-initialized) entries. Such circumstances might exist at the outset of cache use, for example. FIG. 3 then illustrates that PTR2 will, with repeated lower priority writes, fill each available position of the lower priority region 14, and then wrap back down to the boundary 16 defined by PTR1, and begin overwriting previously written lower priority entries as it advances back toward the upper limit of the cache memory.

Of course, this wrap-around writing in the lower priority region 14 assumes that higher priority writes have not advanced the higher priority region 12 to its upper limit. More particularly, PTR1 may be advanced up to the maximum value (or one less than the maximum value) and then allowed to "saturate" or otherwise stick at that value. Once PTR1 sticks at the top of the memory range, all positions below it are unavailable to PTR2, and thus PTR2 effectively is "stuck" at the top of the memory range with PTR1. In such cases, the pointer management logic may leave PTR1 and PTR2 at the topmost memory position, and allow additional higher and lower priority rights in that topmost location, which effectively means that there would be no write prioritization for that topmost position and subsequent higher and lower priority writes simply would successively overwrite the topmost position.

With the above pointer pair arrangement, a microprocessor may conveniently apportion the ways of a cache set between locked and unlocked entries, for example, to reduce hardware and increase code efficiency. ("Locked" writes may be considered as a type of cache write having higher priority than "unlocked" writes.)

More particularly, PTR1 may serve as a locked pointer and PTR2 may serve as an unlocked pointer. PTR2 would be advanced, e.g., incremented, responsive to making unlocked writes, and PTR1 would be advanced responsive to making locked writes. PTR1 would thus point to the first unlocked entry in a cache set, with all entries below it being locked. A locked write would thus overwrite the unlocked (or empty) entry currently pointed at by PTR1, and PTR1 would then advance to the next unlocked position. PTR2 would be adjusted, if necessary, to remain at or above the position of PTR1. Further, PTR2 could be made to wrap back to PTR1 after being advanced to a maximum pointer value, such that the current position of PTR1 establishes the floor for unlocked writes.

This method eliminates the need for a unique floor/ceiling register per cache set and removes the need for a locked and unlocked bit per cache line. Moreover, the method eliminates the necessity of having a programmer manage boundaries between locked and unlocked entries. Finally, grouping locked and unlocked ways in this manner eliminates the necessity of managing interleaved locked and unlocked entries in a cache—i.e., the software is not obligated to manage locked/unlocked status bits per cache entry.

With the above locked/unlocked writes as one example of higher and lower priority cache writes, FIGS. 4-7 illustrate one embodiment of using a pointer pair to manage dynamic partitioning of a cache set 20 into higher and lower priority regions.

The cache set 20 illustrated in FIGS. 4-7 includes sixteen ways (0-15), which may be dynamically partitioned into higher and lower priority regions according to the methods taught herein. More particularly, FIGS. 4-7 illustrate providing a first write pointer (PTR1) for higher priority writes into a cache set 20, providing a second write pointer (PTR2) for lower priority writes into the cache set 20, and using PTR1 as a delimiter for the lower priority writes.

In the illustrated embodiment, using PTR1 as a delimiter for the lower priority writes comprises initializing PTR1 and PTR2 to be equal, advancing PTR1 and PTR2 responsive to making higher and lower priority writes, respectively, and additionally advancing PTR2 as needed to prevent PTR1 from passing PTR2. (Note that "passing," as used in this sense, is a relative term and simply means that PTR2 is not allowed to assume or remain at a pointer value that has been traversed by PTR1.) For example, if PTR1 is currently pointing to way 5 of the 16-way cache set 20 as the next locked write victim, PTR1 generally will have traversed through ways 0-4 of the cache set 20, meaning that PTR2 generally will be prevented from pointing to ways 0-4, to avoid overwriting the locked entries in those positions.

With this general pointer management method in mind, FIG. 4 shows an initialization state of the cache set 20, where PTR1 and PTR2 are initialized to point to way 0 of cache set 20. Thus, operations begin with way 0 being the next victim for either a higher or lower priority. Assuming that three lower priority writes are made without making any higher priority writes, FIG. 5 illustrates the advancement of PTR2 to way 3 such that ways 0-15 of cache set 20 effectively define a lower priority region 22 of cache set 20 (with ways 0-2 containing the just-written entries). Note that PTR1 still points at way 0, meaning that the next victim for a locked write is way 0, such that the unlocked entry previously written into way 0 will be overwritten.

Now, assuming that a higher priority write is made to cache set 20 without making any additional lower priority writes, FIG. 6 illustrates that PTR1 has been advanced to way 1 of cache set 20, such that way 0 of cache set 20 effectively represents a higher priority region 24 of cache set 20. From this illustration, the reader will appreciate that the boundary between the lower priority region 22 and the higher priority region 24 is defined by the current position of PTR1.

Now, assuming that three additional higher priority writes are made without making any further lower priority writes, FIG. 7 illustrates that PTR1 has been advanced from way 1 to way 4, and that the higher priority region 24 now spans from way 0 to way 3. With this advancement of PTR1, the lower priority region 22 has been partially overwritten by higher priority writes, and PTR2 has been advanced along with PTR1, to prevent PTR1 from passing PTR2.

Thus, both PTR1 and PTR2 now point to way 4 of cache set 20. The current positions of PTR1 and PTR2 mean that way 4 is the next victim for either a higher priority write (PTR1) or a lower priority write (PTR2), and that ways 0-3 are locked. At this instant, then, the higher priority region 12 spans from way 0 to way 3, and the lower priority region spans from way 4 to way 15.

On this point, it should be noted that PTR1 generally is advanced linearly through the region of cache memory to which it is assigned, and allowed to stick or otherwise saturate at the top of that region—i.e., PTR1 is prevented from wrapping around—so that the locked entries below PTR1 are protected from being overwritten. Of course, PTR2 may be permitted to advance through the same region of cache memory, so long as it remains at or above the current position of PTR1, and further may be permitted to wrap back from the top of the region to the current position of PTR1. Doing so enables a "round-robin" replacement scheme, wherein newer lower priority writes replace older lower priority writes as needed, based on PTR2 repeatedly cycling through whatever portion of the cache memory region is left to it at or above the current position of PTR1.

In any case, one sees that advancing PTR1 responsive to making higher priority writes defines a higher priority region of the cache memory set 20 corresponding to the portion of the cache memory set 20 traversed by PTR1. By advancing PTR2 responsive to making lower priority writes and, on an as needed basis, responsive to advancing PTR1, one sees that the lower priority region exists above the higher priority region by virtue of a dynamic boundary. Further, one sees that overwrites via wrap-around of PTR2 are permitted for the lower priority region, with the location of PTR1 serving as the wrap-around floor for PTR2 to thereby prevent lower priority writes from overwriting higher priority entries. More succinctly, the value of PTR2 is controlled such that it does not traverse memory locations that have been traversed by PTR1.

Thus, although the ceiling of the lower priority region can move upward in the cache memory set 20, the floor of the lower priority region as defined by the position of PTR1 also can move upward. This allows the higher priority region to grow at the expense of the lower priority region, and ensures that lower priority writes do not overwrite previous higher priority writes.

FIGS. 8 and 9 show another embodiment, wherein PTR1 and PTR2 are initialized to opposite first and second ends of the cache set 20, and move toward each other as higher and lower priority writes are made into the cache set 20. More particularly, as shown in FIG. 8, PTR1 is initialized to a first value, which may be a bottom of the cache set 20, and PTR2 is initialized to a second value offset from the first value, which may be the top of the cache set 20. Then, PTR1 is advanced toward PTR2 responsive to making higher priority writes into cache set 20, and PTR2 is advanced toward PTR1 responsive to making lower priority writes into cache set 20. With this arrangement, the method further includes retreating PTR2, e.g., moving it "backward," as needed to prevent PTR1 from passing it.

FIG. 9 illustrates subsequent positions for PTR1 and PTR2 relative to FIG. 8, assuming that three higher priority writes and two lower priority writes have been made to the cache set 20. As may be seen, ways 15-3 now comprise a lower priority region 22 of the cache set 20 (with ways 15 and 14 containing the just-written lower priority values), and PTR2 points to way 13 as the next victim for a lower priority write. Similarly, ways 0-2 now comprise a higher priority region 24 of the cache set 20, and PTR1 points to way 3 as the next victim for a higher priority write.

Also, it should be noted that PTR2 is permitted to advance toward the current position of PTR1 but not beyond PTR1, and can be permitted to wrap back from PTR1 to PTR2's starting position for round-robin replacement of lower priority cache entries. That is, PTR2 may be advanced downward to the point where it meets PTR1, and then its value may be reset or wrapped back to the top of the cache set 20 such that it is allowed to advance downward again at least to the current position of PTR1.

In general, then, FIGS. 8 and 9 illustrate another approach to managing a pair of cache pointers for a given cache set (or a given region of cache memory), wherein each pointer in the pair is initialized on opposite ends of the cache region of interest, and permitted to move inward toward each other. More particularly, one sees that advancing PTR1 responsive to making higher priority writes defines a higher priority region of the cache set 20 corresponding to the portion of cache set 20 traversed by PTR1. The region of cache set 20 not traversed by PTR1 is defined as a lower priority region bounded by the minimum (or starting) position of PTR2 at one end, and by the dynamically changing position of PTR1 at the other end. Thus, PTR2 is advanced within the lower priority region as needed, responsive to lower priority writes, and is retreated as needed, to prevent PTR1 from passing it.

FIG. 10 illustrates a further expansion of the dynamic partitioning methods taught herein, wherein the cache memory 10 is divided into a highest priority region 12, a next highest priority region 14, and a next highest priority region 30. (In other words, the priority hierarchy is region 12, region 14, and then region 30.)

PTR1 acts as the floor for region 14, and PTR2 acts as the floor for region 30. PTR1 advances upward and thus grows region 12 at the expense of regions 14 and 30, and PTR2 advances upward and thus grows region 14 at the expense of region 30. Both PTR1 and PTR2 may be allowed to advance upward to a maximum or ending position of the cache memory 10 or up to a defined offset less than that maximum position. In contrast, PTR3 may be allowed to grow upward to the maximum position and then wrap back down to PTR2, which acts as the floor (delimiter) for region 30. Thus, all or part of region 30 is subject to being overwritten by entries for region 14 and/or for region 12, and that all or part of region 14 is subject to being overwritten by entries for region 12.

Understood broadly, the above methods teach dynamically partitioning between higher and lower priority regions of cache memory, wherein, for a two-region example, advancing the first write pointer responsive to making higher priority writes defines a higher priority region of the cache memory corresponding to the portion of the cache memory traversed by the first write pointer, and defines a lower priority region of the cache memory corresponding to the portion of cache memory not traversed by the first write pointer. More particularly, the first pointer tracks higher priority writes and is not permitted to wrap; thus, the region of cache memory not traversed by the higher priority pointer represents memory locations into which higher priority writes have not been made, and are therefore locations in which lower priority writes can be made. The lower priority pointer can wrap around within the lower priority region as needed, and the lower priority region shrinks as the higher priority region grows.

FIG. 11 illustrates a microprocessor 40 that may be configured to include one or more methods of managing dynamic cache partitioning as taught herein. Those skilled in the art will appreciate that microprocessor architectures vary widely, and that a large number of circuit arrangements may be used to embody the various methods taught herein. It should be understood, then, that the microprocessor 40 of FIG. 11 stands as a non-limiting example of incorporating dynamic cache partitioning into a microprocessor.

The illustrated microprocessor 40 comprises an instruction pipeline 42 including a front-end unit 44, an execution unit 46, and a completion unit 48. The instruction pipeline 42 is associated with a branch control circuit 50, and with a cache controller 52 that provides cached instructions to the front-end unit 44 from a Level 1 (L1) instruction cache 54, and cached data to the execution unit 46 from a data cache 56. Of particular interest regarding the methods taught herein, the cache controller 52 may be configured to include a partition control circuit for managing partitions in the instruction cache 54 and/or in the data cache 56. The instruction cache 54 (or the data cache 56) may be set associative, or may be fully associative, and the methods taught herein apply equally to either configuration.

FIG. 12 illustrates one embodiment of a partition control circuit 60 that includes or is associated with a pair of registers 62 and 64. The registers 62 and 64 may be used to hold a pair of pointer values (i.e., values for PTR1 and PTR2). For example, assuming that the instruction cache 54 is a 16-way set associative cache, the partition control circuit 60 may maintain a register pair 62 and 64 for each set of the instruction cache 54. By way of non-limiting example, assuming that the instruction cache 54 comprises 64 sets, the partition control circuit 60 may maintain 128 pointers (two per set). For 16 ways per set, each pointer may comprise a 4-bit value allowing it to range from way 0 to way 15 in the corresponding cache set. If more than two priorities are being managed per cache set, then the partition control circuit 60 maintains as many pointers as there are priorities for each cache set—e.g., three priorities=three pointers, and so on.

In at least one embodiment, the partition control circuit 60 includes a pointer selector to select PTR1 or PTR2 as a function of the type of cache write (e.g., high/low priority, locked/unlocked). That is, the pointer selector identifies the type of write, so that the correct one of the two pointers for the targeted cache set may be advanced responsive to making the write. The partition control circuit also may include one or more incrementers, to calculate new pointer values as successive writes are made to the cache set, and also may include one or more comparator circuits, to compare the first and second pointer values to ensure that a lower priority pointer is precluded from taking on values that would cause higher priority writes to be overwritten by lower priority writes.

In addition to integrating the partition control circuit 60 within the cache controller 52 of the microprocessor 40, those skilled in the art will recognize that the partition control circuit 60 can be physically or functionally implemented elsewhere. For example, a Level 2 (L2) cache may be internal or external to the microprocessor 40, and can be configured to provide a secondary cache for holding a larger amount of cached instructions and/or data. In such contexts, the dynamic partition control methods taught herein may be implemented in a L2 cache controller, which typically resides wherever the L2 cache memory arrays reside.

Of course, those skilled in the art will appreciate that the present invention is not limited by the discussion herein relating to various illustrative embodiments, nor is it limited by the accompanying figures. Rather, the present invention is limited only by the following claims, and their legal equivalents.

The invention claimed is:

1. A method of managing cache memory partitioning comprising:
providing a first write pointer addressing locations in a first partition for higher priority writes into the cache memory, and a second write pointer addressing locations in a second partition for lower priority writes into the cache memory; and
using the first write pointer as a delimiter for the lower priority writes.

2. The method of claim 1, wherein using the first write pointer as a delimiter for the lower priority writes comprises generally precluding the second write pointer from pointing to cache memory locations to which higher priority writes have been made.

3. The method of claim 1, wherein using the first write pointer as a delimiter for the lower priority writes comprises initializing the first and second write pointers to be equal, advancing the first and second write pointers responsive to making higher and lower priority writes, respectively, and additionally advancing the second write pointer as needed to prevent the first write pointer from passing the second write pointer.

4. The method of claim 3, further comprising allowing the second write pointer to wrap back from a maximum pointer value to a current value of the first write pointer, or to a value corresponding to a defined offset from the current value of the first write pointer.

5. The method of claim 3, further comprising saturating the first write pointer at a maximum pointer value, or at a defined offset from the maximum pointer value.

6. The method of claim 3, wherein advancing the first write pointer responsive to making higher priority writes defines a higher priority region of the cache memory corresponding to the portion of the cache memory traversed by the first write pointer and defines a lower priority region of the cache memory corresponding to the portion of cache memory not traversed by the first write pointer.

7. The method of claim 1, wherein using the first write pointer as a delimiter for the lower priority writes comprises initializing the first write pointer to a first value, initializing the second write pointer to a second value offset from the first value, advancing the first write pointer toward the second write pointer responsive to making higher priority writes into the cache memory, advancing the second write pointer toward the first write pointer responsive to making lower priority writes into the cache memory, and retreating the second write pointer as needed to prevent the first write pointer from passing the second write pointer.

8. The method of claim 7, wherein advancing the first write pointer responsive to making higher priority writes defines a higher priority region of the cache memory corresponding to the portion of the cache memory traversed by the first write pointer and defines a lower priority region of the cache memory corresponding to the portion of cache memory not traversed by the first write pointer.

9. The method of claim 1, wherein using the first write pointer as a delimiter for the lower priority writes comprises configuring the first and second write pointers to move in the same direction relative to the cache memory, and moving the second write pointer as needed to prevent the first write pointer from passing the second write pointer.

10. The method of claim 1, wherein using the first write pointer as a delimiter for the lower priority writes comprises configuring the first and second write pointers to move toward each other relative to the cache memory, and moving the second write pointer as needed to prevent the first write pointer from passing the second write pointer.

11. The method of claim 1, wherein the first write pointer comprises a locked write pointer and the second write pointer comprises an unlocked write pointer.

12. A method of managing cache memory partitioning comprising:
partitioning a cache memory into adjacent regions comprising a higher priority region with locations addressed by a first write pointer and a lower priority region with locations addressed by a second write pointer; and
using the first write pointer to delimit the lower priority region relative to the higher priority region.

13. A partition control circuit for managing partitions in a cache memory comprising:
a first write pointer configured to address locations in a first partition for making higher priority writes into a cache memory, and a second write pointer configured to address locations in a second partition for making lower priority writes into the cache memory; and a pointer controller configured to use the first write pointer as a delimiter for the lower priority writes.

14. The partition control circuit of claim 13, wherein the partition control circuit comprises an integrated partition control circuit included in a microprocessor for managing at least a portion of a Level 1 (L1) or a Level 2 (L2) cache memory associated with the microprocessor.

15. The partition control circuit of claim 13, wherein the pointer controller is configured to generally preclude the second write pointer from pointing to cache memory locations to which higher priority writes have been made.

16. The partition control circuit of claim 13, wherein the pointer controller is configured to initialize the first and second write pointers to be equal, advance the first and second write pointers responsive to making higher and lower priority writes, respectively, and additionally advance the second write pointer as needed to prevent the first write pointer from passing the second write pointer.

17. The partition control circuit of claim 16, wherein the pointer controller is configured to wrap the second write pointer back from a maximum pointer value to a current value of the first write pointer, or to a value corresponding to a defined offset from the current value of the first write pointer.

18. The partition control circuit of claim 16, wherein the pointer controller is configured to saturate the first write pointer at a maximum pointer value, or at a defined offset from the maximum pointer value.

19. The partition control circuit of claim 13, wherein the pointer controller is configured to initialize the first write pointer to a first value, initialize the second write pointer to a second value offset from the first value, advance the first write pointer toward the second write pointer responsive to making higher priority writes into the cache memory, advance the second write pointer toward the first write pointer responsive to making lower priority writes into the cache memory, and retreat the second write pointer as needed to prevent the first write pointer from passing the second write pointer.

20. The partition control circuit of claim 13, wherein the first and second pointers are generally configured to move in the same direction relative to the cache memory, and wherein the pointer controller is configured to move the second write pointer as needed to prevent the first write pointer from passing the second write pointer.

21. The partition control circuit of claim 13, wherein the first and second write pointers are generally configured to move toward each other, and wherein the pointer controller is configured to move the second write pointer as needed to prevent the first write pointer from passing the second write pointer.

22. The partition control circuit of claim 13, wherein the first write pointer comprises a locked write pointer and the second write pointer comprises an unlocked write pointer.

23. A microprocessor including a partition control circuit configured to manage cache memory partitioning, said partition control circuit comprising:

a first write pointer configured to address locations in a first partition for making higher priority writes into a cache memory, and a second write pointer configured to address locations in a second partition for making lower priority writes into the cache memory; and a pointer controller configured to use the first write pointer as a delimiter for the lower priority writes.

24. The microprocessor of claim 23, wherein the cache memory comprises a set associative cache memory, and wherein the partition control circuit comprises a pair of first and second write pointers for each set of the set associative cache memory, enabling the partition control circuit to manage higher and lower priority partitions in each set.

* * * * *